(12) United States Patent
Park et al.

(10) Patent No.: US 7,326,498 B2
(45) Date of Patent: Feb. 5, 2008

(54) METHOD FOR PREPARING POSITIVE ACTIVE MATERIAL FOR RECHARGEABLE LITHIUM BATTERY AND POSITIVE ACTIVE MATERIAL PREPARED BY SAME

(75) Inventors: Yong-Chul Park, Suwon-si (KR); Geun-Bae Kim, Suwon-si (KR); Jun-Won Suh, Suwon-si (KR); Won-Il Jung, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 32 days.

(21) Appl. No.: 10/996,724

(22) Filed: Nov. 22, 2004

(65) Prior Publication Data

US 2005/0118511 A1 Jun. 2, 2005

(30) Foreign Application Priority Data

Nov. 29, 2003 (KR) ..................... 10-2003-0086080

(51) Int. Cl.
*H01M 4/58* (2006.01)

(52) U.S. Cl. ............................ 429/231.95; 429/231.1; 429/218.1; 429/231.2; 429/231.3; 429/223; 252/182.1; 427/58; 427/126.3; 427/126.4; 427/126.6

(58) Field of Classification Search ............. 429/231.1, 429/218.1, 231.95, 223, 231.2, 231.3; 252/182.1; 427/58, 126.3, 126.4, 126.6
See application file for complete search history.

(56) References Cited

U.S. PATENT DOCUMENTS

| 7,135,251 | B2 * | 11/2006 | Cho et al. ................. 429/231.1 |
| 2003/0082448 | A1 * | 5/2003 | Cho et al. ................. 429/218.1 |
| 2003/0211235 | A1 | 11/2003 | Suh et al. |
| 2003/0211391 | A1 * | 11/2003 | Cho et al. ................. 429/218.1 |

FOREIGN PATENT DOCUMENTS

| JP | 5-266889 | 10/1993 |
| JP | 10-79244 | 3/1998 |
| JP | 2003-123755 | 4/2003 |
| JP | 2003-331846 | * 11/2003 |

OTHER PUBLICATIONS

Patent Abstract of Japan, Publication No. 05-266889, Published on Oct. 15, 1993, in the name of Watanabe, et al.
Patent Abstract of Japan, Publication No. 10-079244, Published on Mar. 24, 1998, in the name of Takanishi, et al.
Patent Abstract of Japan, Publication No. 2003-123755, Published on Apr. 25, 2003, in the name of Arimoto, et al.

* cited by examiner

*Primary Examiner*—Laura Weiner
(74) *Attorney, Agent, or Firm*—Christie, Parker & Hale, LLP

(57) ABSTRACT

Disclosed is a method of preparing a positive active material for a rechargeable lithium battery including adding first and second compounds to a solvent to prepare an acidic solution with a pH from 0.01 to 3, the first compound including an element that is capable of forming a double bond with an oxygen of a lithium metal oxide, and the second compound including at least one element selected from the group consisting of alkali metals, alkali earth metals, group 13 elements, group 14 elements, transition metals and rare-earth elements; adding a lithium-containing compound to the acidic coating solution to coat the lithium-containing compound; and heat-treating the coated lithium-containing compound to form a surface-treatment layer comprising a compound represented by the formula $MXO_k$ where M is an element selected from the group consisting of alkali metals, alkali earth metals, group 13 elements, group 14 elements, transition metals, rare-earth elements and combinations thereof; X is an element that is capable of forming a double bond with oxygen; and k is an integer from 2 to 4.

9 Claims, 1 Drawing Sheet

METHOD FOR PREPARING POSITIVE ACTIVE MATERIAL FOR RECHARGEABLE LITHIUM BATTERY AND POSITIVE ACTIVE MATERIAL PREPARED BY SAME

CROSS REFERENCE TO RELATED APPLICATION

This application claims priority to and is based on Korean Patent Application No. 10-2003-0086080 filed in the Korean Intellectual Property Office on Nov. 29, 2003, the entire disclosure of which is incorporated herein by reference.

FIELD OF THE INVENTION

The present invention relates to a method of preparing a positive active material for a rechargeable lithium battery and a positive active material for a rechargeable lithium battery prepared by same and, more particularly, to a method of preparing a positive active material for a rechargeable lithium battery which exhibits good high-temperature swelling characteristics.

BACKGROUND OF THE INVENTION

Rechargeable lithium batteries, which are attractive as power sources for portable electronics, use organic electrolyte, exhibit twice the discharge capacity of conventional batteries with alkaline aqueous solution electrolyte and have higher energy density than conventional batteries.

Negative active materials for rechargeable lithium batteries are made from materials which are capable of intercalating and deintercalating lithium. Examples of such materials include carbonaceous materials such as graphite, e.g. artificial graphite, natural graphite, or hard carbon. A lower discharge voltage to lithium, i.e. −0.2V from graphite, renders a higher discharge voltage of 3.6V which provides advantages in energy density, and good reversibility guarantees long cycle life.

Positive active materials for rechargeable lithium batteries are also made of material capable of intercalating lithium. Examples include oxides of lithium and transition metals such as $LiCoO_2$, $LiMn_2O_4$, and $LiNiMO_2$ where M is a divalent or trivalent metal. Such an oxide of lithium and a transition metal may be prepared by mixing a lithium compound such as lithium carbonate or lithium hydroxide, a cobalt compound such as lithium oxide or lithium carbonate, or a nickel compound such as $NiM(OH)_2$ or an oxide thereof at a mixing ratio of Li/Co or Li/Ni of approximately 1:1, and sintering the resulting mixture at 600 to 1000° C. for 7 to 25 hours. However, the procedure generates unreacted lithium compounds on the surface of the resulting product, which makes a base positive active material composition, resulting in gelation problems. Furthermore, the unreacted lithium compounds react with $CO_2$ in the ambient atmosphere to generate lithium carbonate which decomposes at high temperatures and generate gas, thereby expanding battery volume and causing a swelling phenomenon. The swelling phenomenon is partly manifested by gas generated due to decomposition of the electrolyte at high temperatures in the battery.

In particular, the swelling phenomenon is severe for nickel-based active materials. This is why a nickel-based active material are not often used despite exhibiting higher capacity and costing less than the more widely used cobalt-based active materials.

Several attempts to reduce the swelling phenomenon have been suggested. Japanese Patent Laid-Open No. Hei. 5-266889 discloses controlling the mixing ratio of Co/Li or Ni/Li to less than 1 to reduce the amount of lithium carbonate produced. However, this procedure produces an unreacted Co or Ni compound, decreasing capacity.

Japanese Patent Laid-Open No. Hei. 10-79244 discloses that a neutralized salt of an organic acid and/or an inorganic acid may be added to a paste containing active materials and a binder to prevent the paste from gelling. However, prior to the achievement of the effect, the active material absorbs $CO_2$ or water, so this is not a satisfactory means for solving the gassing problems.

Japanese Patent Laid-Open No. 2003-123755 discloses that a lithium-containing oxide compound having neutral lithium salt on its surface, is prepared by a method including: washing, filtering and drying the powder of a basic lithium-containing compound oxide with an acidic aqueous solution; spraying the acidic aqueous solution onto the powder of the lithium-containing compound oxide and drying the same; and spraying an acidic gas to the powder of the lithium-containing compound oxide. However, the process partially coats the surface of the lithium-containing compound oxide active material and reduces the amount of lithium that can participate in the charge and discharge, thereby deteriorating the electrochemical characteristics, such as high rate characteristics.

SUMMARY OF THE INVENTION

In an embodiment of the present invention a method for preparing a positive active material for a rechargeable lithium battery is provided which represses production of lithium carbonate and can produce active materials capable of inhibiting high-temperature swelling.

In another embodiment of the invention, a positive active material is provided that is prepared by the method.

These and other aspects may be achieved by a method for preparing a positive active material for a rechargeable lithium battery. In this method, a first compound and a second compound are added to a solvent to prepare an acidic coating solution with a pH from 0.01 to 3. The first solvent includes an element which can form a double bond with an oxygen of a lithium metal oxide, and the second compound includes at least one element selected from the group consisting of alkali metals, alkali earth metals, group 13 elements of the Periodic Table, group 14 elements of the Periodic Table, transition metals, and rare-earth elements. The acidic coating solution is coated on a lithium-containing compound, and the coated lithium-containing compound is heat-treated, thereby obtaining a positive active material for a rechargeable lithium battery with a surface-treatment layer represented by formula 1.

$$MXO_k \tag{1}$$

wherein M is one or more elements selected from the group consisting of alkali metals, alkali earth metals, group 13 elements, group 14 elements, transition metals and rare-earth elements; X is an element capable of forming a double bond with oxygen; and k is a numerical value from 2 to 4.

The present invention further provides a positive active material for a rechargeable lithium battery, including a core including a lithium-containing compound and a surface-treatment layer coated on the core and represented by formula 1.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
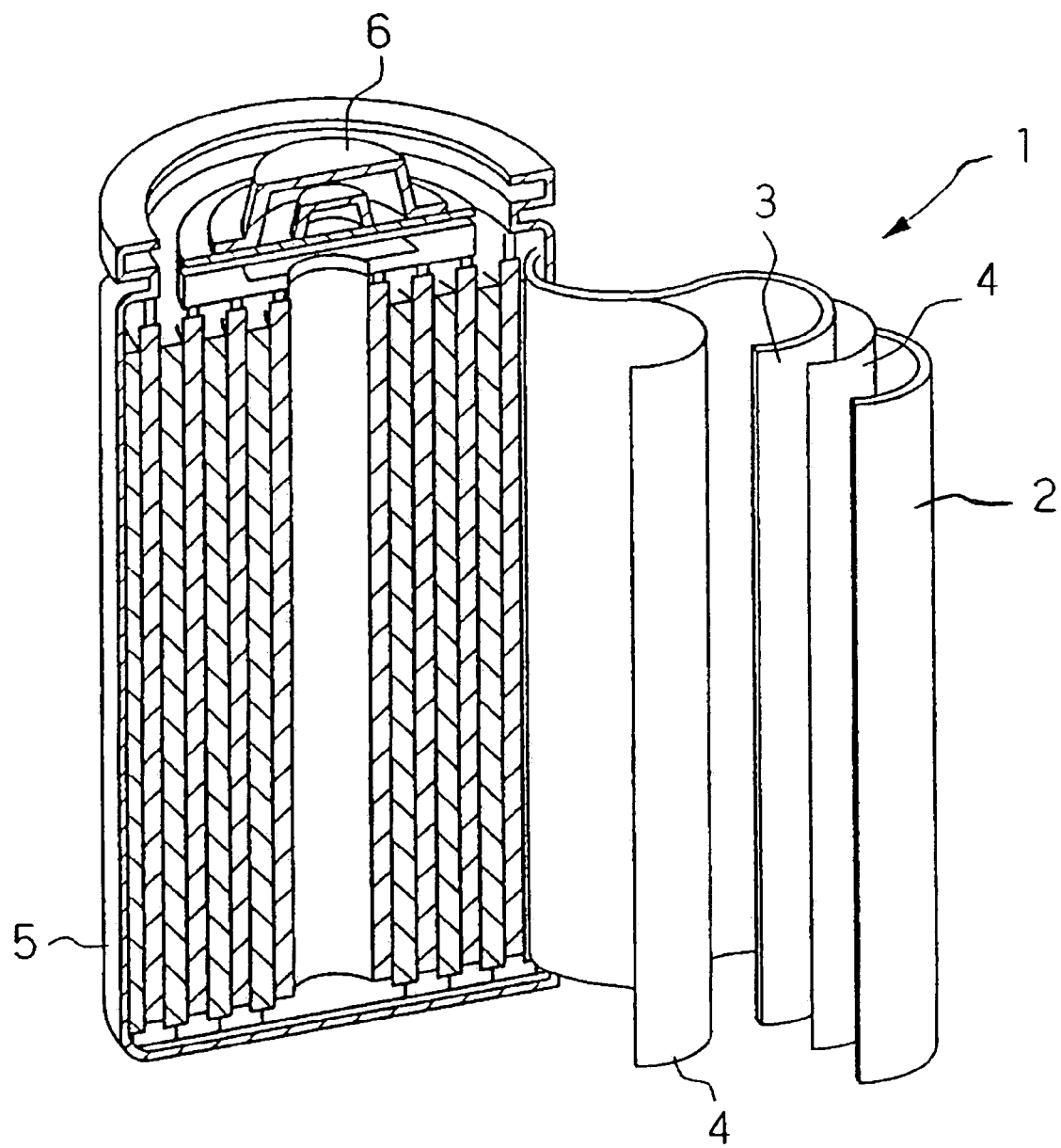
FIG. 1 is a schematic view showing an embodiment of a lithium secondary battery according to the present invention.

The present invention relates to a method of preparing a positive active material with a surface-treatment that exhibits good high-temperature swelling characteristics. The inventive method controls pH of a solution for treating the surface and conditions after drying, to reduce the loss of available Li, and reduces production of carbon-included materials on the surface so that gas caused by the decomposition of the carbon-included materials and production of materials which decompose an electrolyte can be repressed. As a result, the inventive procedure minimizes loss of available lithium and prepares a positive active material without the deterioration of electrochemical characteristics and with good high-temperature swelling characteristics in which volume expansion caused by gas production at high temperatures is substantially reduced.

According to a method of the present invention, an acidic coating solution with a pH of 0.01 to 3 is added to a lithium-containing compound to coat the solution on the compound. The acidic coating solution includes a first compound including an element (hereinafter referred to as "element X") that is capable of forming a double bond with oxygen of a lithium metal oxide, and a second compound including at least one element (hereinafter referred to as "element M") selected from the group consisting of alkali metals, alkali earth metals, group 13 elements of the Periodic Table, group 14 elements, transition metals, and rare-earth elements. The pH of the acidic coating solution is an important factor for controlling electrochemical properties of a resulting product, and is preferably 0.01 to 3, and more preferably 0.8 to 1.3.

The pH of the acidic coating solution can be controlled by varying the mixing ratio of the first compound including element X and the second compound including element M. The preferred mixing ratio of the first compound with element X and the second compound with element M is 0.5 to 2:1.0 to 1.2 by weight ratio, and more preferably 0.95:1 to 1.2 to 1 by weight ratio. If the mixing ratio exceeds this range, the swelling-repression benefits are not fully realized, capacity fading increases, and slurry gelling problems may occur.

The choice of the compound type including element X has no particular limitation other than that the compound should be soluble in water. For example, if X is P, the compound can be diammonium hydrogen phosphate (($NH_4$)$_2$$HPO_4$), $P_2O_5$, $H_3PO_4$, or $Li_3PO_4$.

The element M is selected from the group consisting of alkali metals, alkali earth metals, group 13 elements, group 14 elements, transition metals, rare-earth elements, and combinations thereof. The group 13 elements (according to the new IUPAC agreement) refer to the element group from the Periodic Table that includes Al. The group 14 elements (according to the new IUPAC agreement) refer to the element group from the Periodic Table including Si. Preferred elements for M are Al, Ni, Co, Zr, Mn, Cr, Fe, Mg, Sr, V, Zr, and combinations thereof. The choice of the compound type including one or more of these particular elements has no particular limitation except that the compound should be soluble in water. Preferred examples are nitrates, acetates, and hydrates.

The coating may be achieved by simply adding a predetermined amount of the coating solution to a given amount of the lithium-containing compound followed by thorough mixing and optionally drying, although the present invention is not limited to this method.

The lithium-containing compound used may be any compound which is generally used as a positive active material. Examples include lithiated-intercalation compounds. The advantages attained by the present invention are surprisingly well manifested for the nickel-based compound represented by formula 2 or 3.

$$Li_xNi_yN_{1-y}A_2 \quad (2)$$

$$Li_xNi_yN_{1-y}O_{2-z}Y_z \quad (3)$$

where, $90 \leq x \leq 1.1$, $0.1 \leq y \leq 0.9$, and $0 \leq z \leq 0.5$; N is at least one element selected from the group consisting of Al, Ni, Co, Mn, Cr, Fe, Mg, Sr, V, and rare-earth elements; A is selected from the group consisting of O, F, S, and P; and Y is selected from the group consisting of F, S, or P.

According to a particular embodiment, the coated lithium-containing compound is heat-treated. According to the heat-treatment step, a surface-treatment layer including a compound represented by formula 1 is formed on the lithium-containing compound.

$$MXO_k \quad (1)$$

where M is at least one element selected from the group consisting of alkali metals, alkaline earth metals, group 13 elements, group 14 elements, transition metals, and rare-earth elements; X is an element that is capable of forming a double bond with oxygen; and k is a numerical value from 2 to 4.

Alternatively, the surface-treatment layer may further include a solid-solution compound on a surface of the lithium-containing compound. In this case, a surface-treatment layer of the active material includes both the solid-solution compound and the $MXO_k$ compound. The solid-solution compound includes Li, M', M, X and O where M' and M are independently selected from the group consisting of alkali metals, alkaline earth metals, group 13 elements, group 14 elements, transition metals, and rare-earth elements, and X is an element capable of forming a double bond with oxygen.

When the surface-treatment layer includes the solid-solution compound and a compound represented by formula 1, the elements M and X have a concentration gradient from the surface of the active material toward the center of the active material particle grain. That is, the elements M and X have a high concentration at the surface of the active material and the concentration gradually decreases toward the inside of the particle.

The heat-treatment is preferably performed at a temperature between 450 and 900° C., and more preferably between 600 and 800° C. If the heat-treating temperature is less than 600° C., the side products do not completely decompose, and if the heat-treating temperature is more than 800° C., the capacity decreases significantly.

The heat-treating step is preferably performed for 1 to 20 hours. If the heat-treating time is excessive, the compound represented by formula 1 diffuses into the inside of the active material resulting in decreased battery capacity. Before the heat-treatment process, a step of drying the coated compound may be additionally performed.

The positive active material prepared by the above procedures includes a core including the lithium-containing compound, and the surface-treatment layer including the compound represented by formula 1.

The total amount of M and X in the active material is preferably 0.01 to 10 wt % based on the total amount of the active material, and more preferably 1 to 4 wt %. If the total amount of M and X is less than 0.01 wt %, the desired effect is not realized, and if it is more than 10 wt %, capacity fading and deterioration of the high-rate characteristics occur.

The amount of M is preferably 0.005 to 5 wt % based on the active material, and is more preferably 0.5 to 2 wt %. The amount of X is preferably 0.005 to 5 wt % wt % based on the active material, and more preferably 0.5 to 2 wt %.

The pH of the positive active material of the present invention is preferably 8 to 13, and more preferably 10 to 11.5. If the pH is more than 13, gelation of active material composition makes it is difficult to form an electrode and battery properties such as swelling characteristics deteriorate. For the present invention, the pH is measured by adding 2 g of active material to 100 g of water, stirring the mixture, allowing the stirred mixture to stand for 5 to 10 minutes and then measuring the pH of the mixture.

The thickness of the surface-treatment layer is preferably 0.01 to 2 μm, and more preferably 0.01 to 1 μm. If the thickness is less than 0.01 μm, the surface-treatment effect is insufficient. If the thickness is more than 2 μm, the capacity decreases.

The positive active material may be used for all batteries, and especially rechargeable lithium batteries, and is effective for improving the performance characteristics of a positive electrode. The rechargeable lithium battery includes a negative electrode and an electrolyte. The negative electrode includes a negative active material which is capable of intercalating and deintercalating lithium ions. Examples of the negative active material may be carbonaceous materials such as crystalline or amorphous carbon, or a carbon composite (thermally decomposed carbon, cokes, graphite), a combusted organic polymer, carbon fiber, a tin oxide compound, lithium metal or a lithium alloy.

The electrolyte includes a non-aqueous organic solvent and a lithium salt.

The non-aqueous organic solvent acts as a medium which can transport ions that participate in the electrochemical reactions. Suitable non-aqueous organic solvents include carbonates, esters, ethers, or ketones. Examples of carbonates include dimethyl carbonate, diethyl carbonate, dipropyl carbonate, methylpropyl carbonate, ethylpropyl carbonate, methylethyl carbonate, ethylene carbonate, propylene carbonate, and butylene carbonate. Examples of esters include y-butyrolactone, n-methyl acetate, n-ethyl acetate, and n-propyl acetate. Examples of ethers include dibutyl ether, and examples of ketones include polymethylvinyl ketone. The non-aqueous organic solvent preferably includes a mixture of a cyclic carbonate and a chain carbonate. In this case, the volume ratio between the cyclic carbonate and the chain carbon is preferably 1:1 to 1:9. The above mixing ratio promotes the desired battery performances.

Alternatively, the non-aqueous organic solvent may further include an aromatic hydrocarbon organic solvent. In this case, the aromatic hydrocarbon organic solvent may be used together with a carbonate organic solvent. Suitable aromatic hydrocarbon organic solvents include aromatic hydrocarbon compounds represented by formula 4.

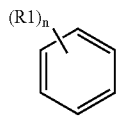

(4)

where, R1 is $NO_2$, a halogen or a $C_1$ to $C_{10}$ alkyl; and n is an integer from 0 to 6.

Examples of aromatic hydrocarbon organic solvents include benzene, fluorobenzene, chlorobenzene, nitrobenzene, toluene, fluorotoluene, trifluorotoluene, and xylene. The volume ratio of the carbonate solvent and the aromatic hydrocarbon solvent is preferably from 1:1 to 1:30. The desired battery performance is best achieved when the solvents are within these ranges.

The lithium salts are dissolved in an organic solvent to act as a lithium-ion supporting source, which helps to promote operation of the battery and facilitate the transfer of lithium ions. The lithium salt may be selected from $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), $LiCl$, and $LiI$, supporting salts and combinations thereof.

The concentration of the lithium salt is suitably 0.1 to 2.0M in the electrolyte. When the concentration of the lithium salt is less than 0.1M, the conductivity of the electrolyte is decreased so that the electrolyte performance is deteriorated, while when the concentration is more than 2.0M, the viscosity of the electrolyte is too high to facilitate movement of lithium ions.

The rechargeable lithium battery may further include a separator which prevents short circuits between the positive electrode and the negative electrode. The separator may be a polymer provided as a single layer film or a multiple layer film. Examples include polyolefin, polypropylene, polyethylene, microporous films, and woven or non-woven polymers.

The rechargeable lithium battery with the electrolyte, the positive electrode, the negative electrode and a separator may be formed as a unit cell with a positive electrode, a separator, and a negative electrode, as a bi-cell with a positive electrode, a separator, a negative electrode and a separator, or a stacking cell in which the unit cell is repeated.

An embodiment of the rechargeable lithium battery of the present invention is illustrated in FIG. 1. The rechargeable lithium battery includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 1, as it can be readily modified into other types of batteries including prismatic batteries, pouch type batteries and other types of batteries as are well understood in the related art.

The following examples illustrate the present invention in further detail, but it is understood that the present invention is not limited by these examples.

EXAMPLE 1

A solution was prepared by adding 30 g of $Al(NO_3)_3 \cdot 9H_2O$ and 10.8 g of $(NH_4)_2HPO_4$ (mole ratio: 1:1) to 400 ml of water to prepare an acidic coating solution with a pH of 2.1. To the coating solution was added 1000 g of $Li_{1.03}Ni_{0.8}Co_{0.1}Mn_{0.1}O_2$ with a diameter of 10 μm prepared by co-precipitation. The coating solution and then dried at 130° C. for 10 hours. The dried material was pulverized and heat-treated at 800° C. for 7 hours to prepare a positive active material including a surface-treatment layer with a solid-solution compound including Al and P, and an $AlPO_4$ compound.

The positive active material and a carbon conductive agent were added to a binder solution of a 6 wt % polyvinylidene fluoride binder in an N-methyl pyrrolidone solvent, at a weight ratio of 96:2:2 for the positive active material, the conductive agent and the binder, and were mixed with a planetary mixer, thereby obtaining a positive active material slurry. The positive active material slurry was coated on an Al foil current collector.

A graphite negative active material was added to a binder solution of an 8 wt % polyvinylidene fluoride binder in a N-methylpyrrolidone solvent at a weight ratio of the negative active material to the binder of 94:6 and mixed to prepare a negative active material slurry. The slurry was coated on a Cu foil current collector.

The coated current collector was pressed using a pressurizer in order to obtain a positive active mass of 3.5 g/cm$^3$ and a negative active mass of 1.6 g/cm$^3$. Using the pressed current collector, a rechargeable lithium battery with a capacity of 700 mAh was fabricated by the general procedure such as cutting, and was dried for 12 hours. For an electrolyte, 1.15M $LiPF_6$ in a mixed solvent of ethylene carbonate, ethyl methyl carbonate and diethyl carbonate (3:6:1 volume %) was used.

EXAMPLE 2

A rechargeable lithium battery was fabricated by the same procedure as Example 1, except that 30.6 g of $Al(NO_3)_3 \cdot 9H_2O$ and 10.8 g of $(NH_4)_2HPO_4$ (mole ratio of 1.02:1) were added to 400 ml of water to prepare an acidic coating solution with a pH of 1.4. The total amount of Al and P was 3 wt % of the total active material weight.

EXAMPLE 3

A rechargeable lithium battery was fabricated by the same procedure as Example 1, except that 30 g of $Al(NO_3)_3 \cdot 9H_2O$ and 9 g of $(NH_4)_2HPO_4$ (mole ratio of 1.02:1) were added to 400 ml of water to prepare an acidic coating solution with a pH of 1.2. The total amount of Al and P was 3 wt % of the total active material weight.

EXAMPLE 4

A rechargeable lithium battery was fabricated by the same procedure as Example 1, except that 30 g of $Al(NO_3)_3 \cdot 9H_2O$ and 9 g of $(NH_4)_2HPO_4$ (mole ratio of 1.02:1) were added to 400 ml of water to prepare an acidic coating solution with a pH of 0.95. The total amount of Al and P was 3 wt % of the total active material weight.

EXAMPLE 5

A rechargeable lithium battery was fabricated by the same procedure as Example 1, except that 30.6 g of $Al(NO_3)_3 \cdot 9H_2O$ and 3.8 g of $(NH_4)_2HPO_4$ (80% solution, mole ratio of 1.02:1) were added to 400 ml of water to prepare an acidic coating solution with a pH of 0.82. The total amount of Al and P was 3 wt % of the total active material weight.

COMPARATIVE EXAMPLE 1

A rechargeable lithium battery was fabricated by the same procedure as Example 1, except that 30 g of $Al(NO_3)_3 \cdot 9H_2O$ and 19.5 g of $(NH_4)_2HPO_4$ (mole ratio of 1:1.85) were added to 400 ml of water to prepare an acidic coating solution with a pH of 4.1. The total amount of Al and P was 3 wt % of the total active material weight.

COMPARATIVE EXAMPLE 2

To 1 L of a of 0.4 mol/L HCl solution, 100 g of $Li_xNi_{0.8}Co_{0.1}Mn_{0.1}O_2$ was added and the mixture was shaken for 1 hour, then washed and filtered followed by drying at 130° C. for 10 hours to prepare a positive active material. Using the positive active material, a rechargeable lithium battery was fabricated by the same procedure as in Example 1.

The rechargeable lithium battery was allowed to stand at room temperature for 3 days to age, and it was then formation charged at a 0.2C current density for 1 hour. The aged battery was melted and adhered under a vacuum and additionally formation charged and then formation discharged followed by the standard charge and discharge to activate the battery. For formation charging, the applied current was set to 0.2C, and for the discharge, the applied current was set to 0.2C. For the standard charging, the applied current was set to 0.5C, and for the standard discharging, the applied current was set to 0.2C.

The upper and lower cut-off voltages were respectively 4.2V and 2.75V. Charging was performed at a constant current/constant voltage mode at a current cut-off condition (20 mA) of 4.2V, and the discharging was performed at a constant current mode at a voltage cut-off condition of 2.75V. The measurement for the cycle life was performed at a 1C charging and discharging current with the same cut-off conditions for the formation and the standard. The capacity at the formation and the standard charging and discharging (0.2C) and the capacity at the cycle life measurement (1C) were measured. The capacity retention rate data (capacity at 1C/capacity at 0.2C) are presented in Table 1.

Furthermore, the charged batteries were allowed to stand at 85° C. for 4 hours in a chamber and the increases in thickness (swelling characteristic) were measured. These results are also presented in Table 1.

The carbon content in the positive active materials according to Examples 1 to 5 and Comparative Examples 1 to 2 was measured using a CS analyzer (carbon-sulfur analyzer). These results are also shown in Table 1.

TABLE 1

| | pH of coating solution | Moles of Li | Carbon content(ppm) | Increases in thickness (%) | Capacity retention (%) (capacity at 1 C/ capacity at 0.2 C) |
|---|---|---|---|---|---|
| Example 1 | 2.1 | 1.0 | 680 | 25 | 93 |
| Example 2 | 1.4 | 1.0 | 550 | 18 | 93 |
| Example 3 | 1.2 | 1.0 | 500 | 14 | 93 |
| Example 4 | 0.95 | 1.0 | 390 | 8 | 92 |
| Example 5 | 0.82 | 1.0 | 380 | 8 | 91.5 |

TABLE 1-continued

|  | pH of coating solution | Moles of Li | Carbon content(ppm) | Increases in thickness (%) | Capacity retention (%) (capacity at 1 C/ capacity at 0.2 C) |
| --- | --- | --- | --- | --- | --- |
| Comparative Example 1 | 4.1 | 1.0 | 1210 | 52 | 93 |
| Comparative Example 2 | 0.6 | 0.95 | 240 | 5 | 86 |

As shown in Table 1, the positive active materials using the coating solution with a pH from 0.82 to 2.1, as set forth in Examples 1 to 5, included lower carbon content than that according to Comparative Example 1. Thus, they are expected to minimize the generation of gas caused by the decomposition of carbon-included material at high temperatures and the generation of materials which cause the decomposition of the electrolyte. Such a result was supported by the lower increase in thickness of the cells according to Examples 1 to 5 compared to Comparative Example 1. Furthermore, according to Comparative Example 2, using a stronger acid than was used in Examples 1 to 5 exhibited a greatly reduced carbon content compared to Examples 1 to 5, thereby improving the swelling characteristics, but the capacity retention was greatly reduced.

EXAMPLE 6

A rechargeable lithium battery was fabricated by the same procedure as Example 1, except that $LiCoO_2$ was used instead of $Li_{1.03}Ni_{0.8}Co_{0.1}Mn_{0.1}O_2$.

COMPARATIVE EXAMPLE 3

A rechargeable lithium battery was fabricated by the same procedure as Example 2, except that an acidic coating solution was not used.

COMPARATIVE EXAMPLE 4

A rechargeable lithium battery was fabricated by the same procedure as Example 6, except an acidic coating solution was not used.

The carbon content in the positive active materials according to Example 6 and Comparative Examples 3 to 4 were measured by the same procedure as used in providing the results of Table 1. The results are shown in Table 2 together with the result of Example 2.

As shown in Table 2, the positive active materials surface-treated with the coating solution according to Examples 6 to 2 included lower carbon content than Comparative Examples 3 and 4. Thus, they are expected to reduce the generation of gas caused by the decomposition of the carbon-included material at high temperatures and the generation of materials which causes the decomposition of the electrolyte. Such an expectation was supported by the lower increase in thickness of the cells according to Examples 6 to 2 compared to Comparative Examples 3 and 4.

As described above, the method of preparing a positive active material of the present invention controls the pH of a coating solution, thereby obtaining a positive active material exhibiting good high-temperature swelling characteristics.

What is claimed is:

1. A method of preparing a positive active material for a rechargeable lithium battery comprising:

adding first and second compounds to a solvent to prepare an acidic coating solution with a pH of from 0.01 to 3, the first compound including an element that is capable of forming a double bond with an oxygen of a lithium metal oxide, and the second compound including at least one element selected from the group consisting of alkali metals, alkali earth metals, group 13 elements, group 14 elements, transition metals, and rare-earth elements;

coating a lithium-containing compound with the acidic coating solution to produce a coated lithium-containing compound; and heat-treating the coated lithium-containing compound to form a surface-treatment layer comprising a compound represented by formula 1, $$MXO_k \qquad (1)$$

where, M is at least one element selected from the group consisting of alkali metals, alkali earth metals, group 13 elements, group 14 elements, transition metals, and rare-earth elements, X is an element that is capable of forming a double bond with oxygen, and k is a numerical value from 2 to 4.

TABLE 2

|  | pH of coating solution | Moles of Li | Carbon content(ppm) | Increases in thickness (%) | Capacity retention (%) (capacity at 1 C/ capacity at 0.2 C) |
| --- | --- | --- | --- | --- | --- |
| Comparative Example 3 | — | 1.05 | 200 | 6 | 95 |
| Example 6 | 1.4 | 1.0 | 170 | 5 | 93 |
| Comparative Example 4 | — | 1.0 | 2500 | 250 | 93 |
| Example 2 | 1.4 | 1.0 | 550 | 8 | 92 |

2. The method of claim 1, wherein element M is selected from the group consisting of Na, K, Mg, Ca, Sr, Ni, Co, Si, Ti, B, Al, Sn, Mn, Cr, Fe, V, Zr, and combinations thereof.

3. The method of claim 1, wherein element X is selected from the group consisting of P, S, W, and combinations thereof.

4. The method of claim 1, wherein the pH of the acidic coating solution is from 0.8 to 1.3.

5. The method of claim 1, wherein a molar mixing ratio of the first compound to the second compound is from 0.5 to 2:1.0 to 1.2.

6. The method of claim 1, wherein the heat-treating step is performed at 450 to 900° C.

7. The method of claim 1, wherein the heat-treating step is performed for 1 to 20 hours.

8. The method of claim 1, wherein the surface-treatment layer further comprises a solid solution comprising an element selected from elements that are capable of forming a double bond with an oxygen of a lithium metal oxide, alkali metals, alkali earth metals, group 13 elements, group 14 elements, transition metals, and rare-earth elements.

9. The method of claim 1, wherein the lithium-containing compound is represented by one of formulae 2 or 3, $$Li_xNi_yN_{1-y}A_2 \qquad (2)$$

$$Li_xNi_yN_{1-y}O_{2-z}Y_z \qquad (3)$$

where, $0.90 \leq x \leq 1.1$, $0.1 \leq y \leq 0.9$, $0 \leq z \leq 0.5$, N is at least one element selected from the group consisting of Al, Ni, Co, Mn, Cr, Fe, Mg, Sr, V, and rare-earth elements, A is an element selected from the group consisting of O, F, S and P; and Y is selected from the group consisting of F, S, and P.

* * * * *